Feb. 7, 1961 C. B. COLLINS 2,970,514
LIGHT INTENSIFYING MEANS FOR COPYING CAMERA
Filed March 20, 1956 3 Sheets-Sheet 1
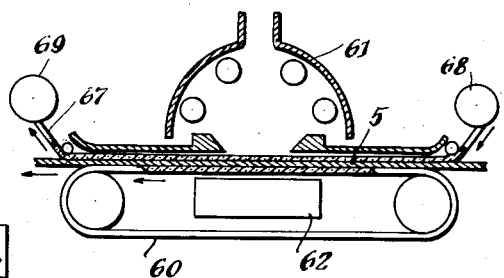
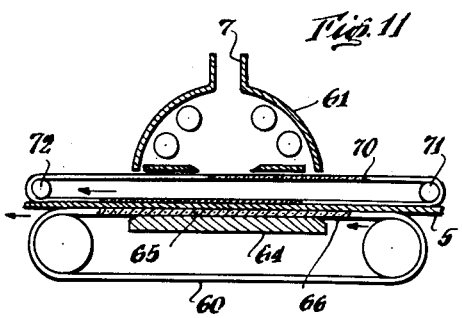
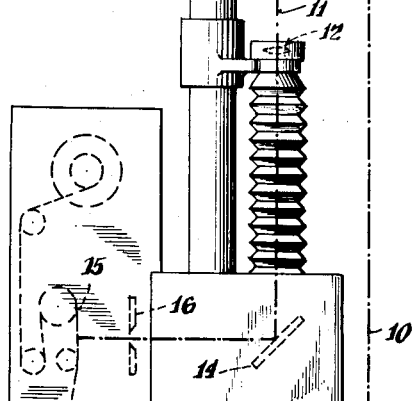
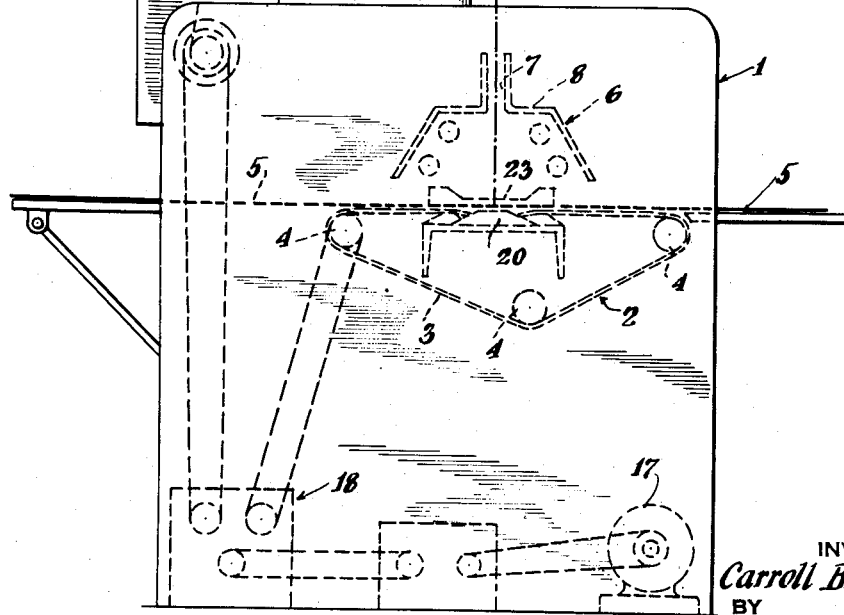
INVENTOR
Carroll B. Collins
BY
Norman H. Holland
ATTORNEY

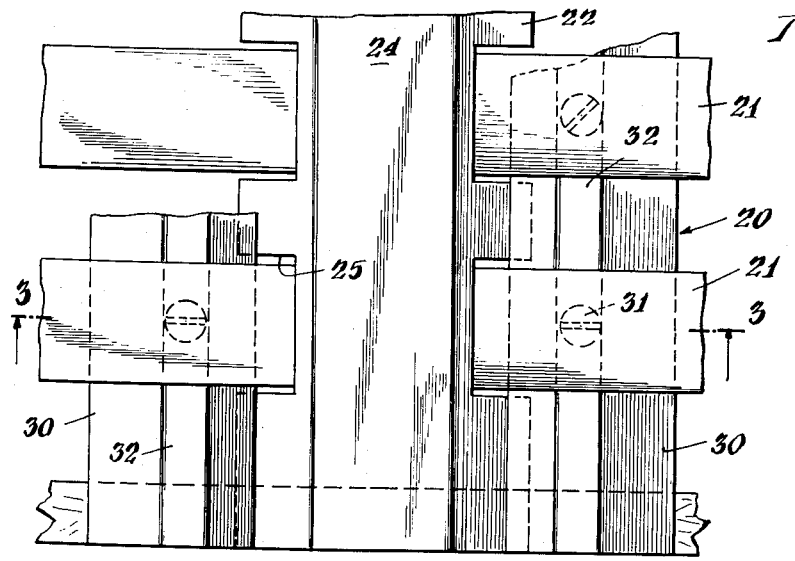
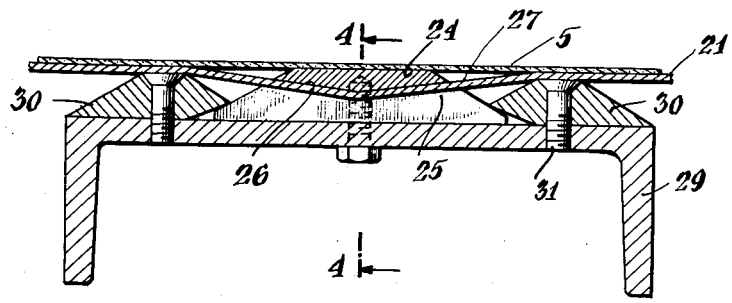
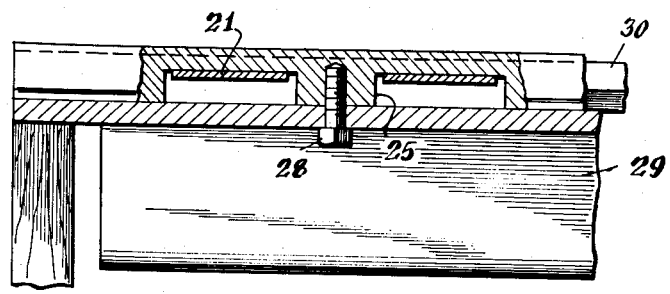
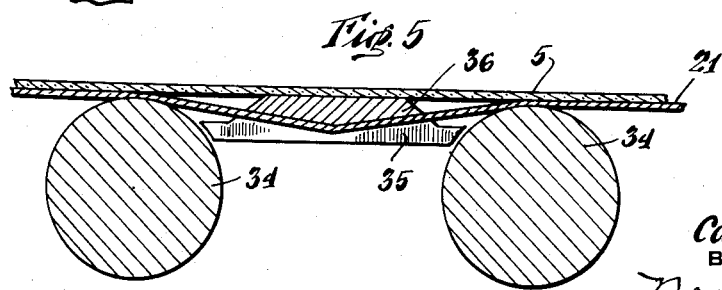

Feb. 7, 1961 C. B. COLLINS 2,970,514
LIGHT INTENSIFYING MEANS FOR COPYING CAMERA
Filed March 20, 1956 3 Sheets-Sheet 3
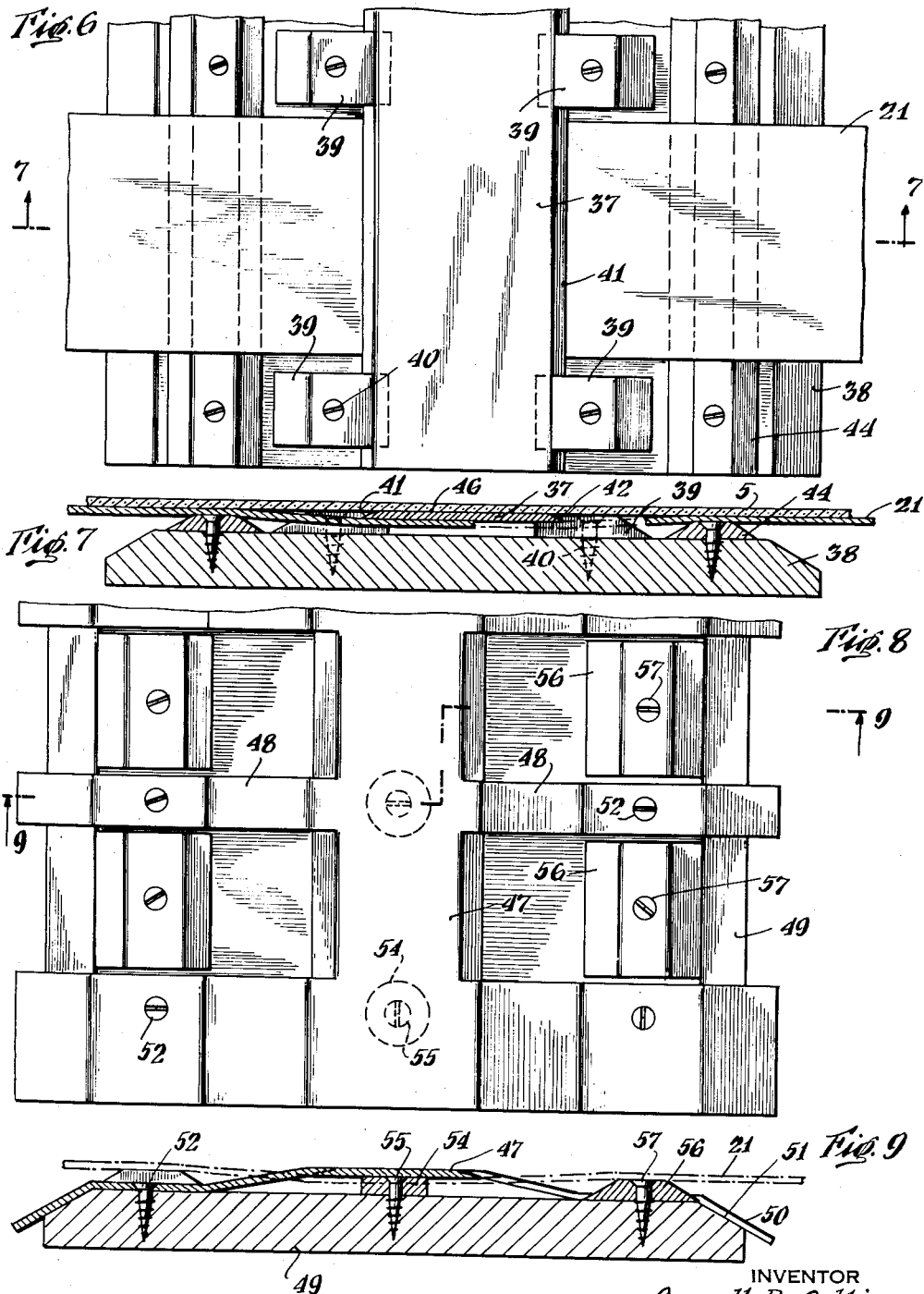
INVENTOR
Carroll B. Collins
BY
ATTORNEY United States Patent Office 2,970,514
Patented Feb. 7, 1961

2,970,514

LIGHT INTENSIFYING MEANS FOR COPYING CAMERA

Carroll B. Collins, Cochranton, Pa., assignor to Peerless Photo Products, Inc., Shoreham, N.Y., a corporation of New York Filed Mar. 20, 1956, Ser. No. 572,666

12 Claims. (Cl. 88—24)

The present invention relates to a copying camera and more particularly to an illumination-intensifying means for the platen of a flow-type copying camera.

In flow-type copying cameras, the original to be copied is moved in front of an aperture which defines a portion of the original for transmission by a suitable lens system to a moving sensitized copying film. The original and the copying film are moved in synchronism so that as the original is moved beneath the aperture, the aperture in effect scans the complete moving original so that a complete copy thereof is formed on the moving sensitized copying film.

In flow-type copying cameras which use a conveyor belt to move transparent, translucent, or light permeable original documents beneath the aperture during the copying action, the illumination for the original is provided by lamps mounted adjacent to the aperture and on the same side of the conveyor belt as the aperture. Such copy cameras do not now provide for an effective reflective component of the light source from the conveyor belt back through the original and into the lens system through the aperture as it has not been found practical to provide a suitable reflector surface on the conveyor belts themselves.

Accordingly, an object of the present invention is to provide an improved conveyor belt flow-type copying camera.

Another object of the present invention is to provide for an increased light transmission through the original document being copied by a flow-type copying camera.

Another object of the present invention is to provide an improved platen for a flow-type copying camera.

Another object of the present invention is to provide an improved reflector type of platen for a conveyor belt flow-type copying camera.

Another object of the present invention is to provide an improved illumination means for the original document being copied by a conveyor belt flow-type copying camera.

Other and further objects of the invention will be obvious upon an understanding of the illustrative embodiment about to be described, or will be indicated in the appended claims, and various advantages not referred to herein will occur to one skilled in the art upon employment of the invention in practice.

A preferred embodiment of the invention has been chosen for purposes of illustration and description and is shown in the accompanying drawings, forming a part of the specification, wherein:

Fig. 1 is a side elevational view of a flow-type copying camera having an illumination intensifying means in accordance with the present invention;

Fig. 2 is an enlarged fragmentary top plan view of a reflector platen according to the present invention;

Fig. 3 is a sectional view of the platen of Fig. 2 taken along the line 3—3 of Fig. 2;

Fig. 4 is a sectional view of the platen of Fig. 2 taken along the line 4—4 of Fig. 3;

Fig. 5 is an enlarged cross sectional view of another embodiment of the reflector platen of the invention;

Fig. 6 is a fragmentary top plan view of another embodiment of the reflector platen of the invention;

Fig. 7 is a sectional view of the platen of Fig. 6 taken along the line 7—7 of Fig. 6;

Fig. 8 is a fragmentary top plan view of another embodiment of the reflector platen of the invention;

Fig. 9 is a sectional view of the platen of Fig. 8 taken along line 9—9 of Fig. 8;

Fig. 10 is a diagrammatic view of another embodiment of the light-intensifying means of the invention; and Fig. 11 is a diagrammatic view of the light-intensifying means of Fig. 10 using a reflector platen.

The illumination intensifying means of the present invention will first be described generally in connection with the flow-type copying camera of Fig. 1. The present invention, however, may be used in other types of conveyor belt flow-type copying cameras.

The flow-type copying camera 1 has a conveyor 2 comprising conveyor belts 3 mounted on a set of rollers 4. The conveyor 2 carries an original document 5 at a constant rate beneath a light source 6. An aperture 7 is provided in reflector 8 to admit the reflected image of the original document 5 to the reflector system 9. Thus, light rays 10 reflected vertically from the document 5 pass upwardly to the reflector system 9 which reflects them downwardly again as rays 11 through a lens system indicated at 12. Lens system 12 directs the rays 11 against a reflector 14 which reflects the rays onto the moving copying film 15 through a suitable aperture 16. The copying film 15 and the conveyor 2 are driven in synchronism by drive motor 17 by a transmission system indicated generally at 18.

Mounted centrally of the conveyor 2 is a reflector platen 20 which provides increased reflection of the light source 6 through an original document 5 being copied by camera 1, as will be explained more fully below.

The reflector platen 20 is shown in detail in Figs. 2-4. The conveyor belt 3 comprises a number of strips 21 mounted generally parallel to each other on the rollers 4. The reflector platen 20 is mounted generally transversely of the strips 21 and comprises a transverse reflector bar 22 having an upper reflecting surface 24 which contacts the original 5 and which preferably has a highly reflective finish such as a polished or a coated finish to reflect the light rays from the light source 6 through the original 5 toward the aperture 7. The addition of the reflected rays from the reflecting surface 24 to the rays reflected directly from the surface of the original provide a more brilliant image for transmission to the copying film 15.

In order to provide for a direct contact between the original 5 and the reflecting surface 24, a transverse tunnel or aperture 25 is provided in the reflector bar 22 for each of the conveyor belt strips 21. The apertures 25 are spaced from the reflecting surface 24 and have a generally rounded and smooth upper surface 26 to provide a smooth bearing surface for the upper surface 27 of the conveyor belt strips 21. The reflector bar 22 is mounted transversely of the conveyor 2 by screws 28 on a suitable mounting channel 29. In order to cause the original 5 to slide easily on and off the conveyor belt strips 21 on either side of the reflector bar 22 and in order to help maintain the original 5 in flat condition on the reflective surface 24 of the reflector bar 22, conveyor belt leveling bars 30 are provided on either side of the reflector bar mounted generally parallel to the reflector bar 22 by screws 31. The leveling bars 30 have a smooth bearing surface 32 at their top positioned slightly below the level of the reflective surface 24 of reflector bar 22 so that the original 5 remains level between the two leveling bars 30 as the conveyor strips 21 loop downwardly beneath the reflective surface 24 of the reflector bar 22.

Fig. 5 shows another embodiment of the reflector platen in which the leveling bars 30 of the platen of Figs. 2 through 4 are replaced by rollers 34 having their upper edge positioned to maintain the original 5 level as the conveyor belt strips 21 pass through aperture 35 in reflector bar 36. The rollers 34 provide a leveling action with a minimum frictional drag on the original 5.

Figs. 6 and 7 show another embodiment of the reflector platen. In this embodiment the reflector bar comprises a relatively flat plate 37 spaced from a supporting member 38 by spacers 39. The spacers 39 are screwed to the supporting member 38 by screws 40 and they are spaced laterally to accommodate the conveyor belt strips 21 therebetween (Fig. 6). The beveled edges 41 of the plate 37 are fitted into complementary slots 42 in the spacers 39 to lock the plate 37 in place. Leveling rods 44, similar to the rods 30 of the above-described reflector platen 20, are mounted parallel to the plate 37 and are fastened to the supporting member 38 by screws 45. The reflector plate 37 is preferably formed of steel or aluminum or other suitable metal and has its upper surface 46 polished to provide a reflective surface. If desired, a white or other highly reflective coating may be applied to the surface 46 of plate 37.

Figs. 7 and 8 show another embodiment of the reflector platen. In this embodiment the transverse reflecting plate 47 has integral spacers 48 extending outwardly therefrom between the conveyor strips 21. These spacers 48 are bent downwardly to contact the support member 49 and have a flange portion 50 overlying the beveled edge 51 of the support member 49. The spacers 48 are fastened to the support member 49 by screws or other suitable fasteners 52 to hold the reflecting plate 47 in position. The center of the reflecting plate 47 is spaced from the support member 49 by spacers 54 fastened by screws 55 to the support member 49. Between each pair of the spacers 47 a leveling block 56 is mounted by screws 57. The leveling blocks 55 function as do the above-described leveling bars 30 and 44 to keep the original being carried by the conveyor belts level and to guide it onto the reflective plate 47.

Fig. 10 shows another embodiment of the illumination intensifying means of the present invention. In this embodiment the conveyor belt 60 is made of a transparent material and the light source 61 above the conveyor belt is aided by an illumination intensifying means 62 positioned beneath the transparent conveyor belt. The illumination intensifying means 62 may comprise an additional light source or a suitable reflector means to reflect the light rays from the light source 61.

Fig. 11 shows a transparent conveyor belt 60 generally similar to the conveyor belt in Fig. 10 having a reflector type of platen 64 mounted beneath the light source 61 and adjacent to the lower side 66 of the conveyor belt 60. Reflector platen 64 is preferably made of steel or aluminum or another metal capable of having its upper surface 65 polished or coated to provide a simple reflecting surface so that the light rays passing through the original 5 and the transparent conveyor belt 60 from the light source 61 are reflected back towards the aperture 7. In this case the apertures or tunnels in the platen, such as apertures 25 in the above-described platen 20, are not necessary as the transparent conveyor belt readily passes sufficient light to provide for a suitable increase in intensity by light reflection from the reflective surface 65 of the platen 64.

In the document handling means shown in Fig. 1, a transparent plate 23 is shown positioned above the platen 20 to hold the original down against the upper surface of the platen 20. Fig. 10 shows another embodiment in which a transparent belt or film 67 is used to hold the original 5 down against the belt 60. Film 67 comprises a relatively long transparent film which is wound from roller 68 to roller 69 at the same rate as the conveyor 60 moves the original 5. The film is rewound when completely unrolled from roller 68 to permit another run. Fig. 11 shows an endless transparent belt 70 which is run between rollers 71 and 72 at the same speed as the conveyor 60 to hold the original 5 in place against conveyor 60. Each of the transparent means 23, 67, or 70 may be used with any of the document handling means of the invention shown in Figs. 1, 10, and 11.

The conveyor belt 60 of Figs. 10 and 11 may be made relatively clear or transparent and it also is effective in a less light pervious or translucent material.

It will be seen that this invention provides an improved flow-type copying camera having greater effective illumination adjacent to the image defining aperture and the conveyor belt for the original document being copied. The illumination intensifying means of the invention is relatively simple and effective and is also readily adapted to existing flow-type copying cameras which use a conveyor belt to move the original past an image defining aperture. The reflector type of platens disclosed by the invention provide an effective and relatively simple means for increasing the effectiveness of the copying cameras without requiring additional light sources with their undesirable additional heat. Copying cameras using the illumination intensifying means of the present invention are made more efficient as they may be run at higher speeds and thus turn out a greater volume of work.

As various changes may be made in the form, construction and arrangement of the parts herein without departing from the spirit and scope of the invention and without sacrificing any of its advantages, it is to be understood that all matter herein is to be interpreted as illustrative and not in a limiting sense.

Having thus described my invention, I claim:

1. A document handling means for a flow-type copying camera comprising a generally horizontal conveyor means, a relatively narrow and elongated reflective platen intermediate the ends of said conveyor and transverse thereof, said platen having a relatively flat and reflective upper surface, tunnel means in said platen whereby said conveyor passes through said platen and beneath the reflective upper surface thereof.

2. A document handling means for a flow-type copying camera comprising a generally horizontal conveyor means, said conveyor means comprising a plurality of relatively narrow parallel belts, a relatively narrow and elongated reflective platen intermediate the ends of said conveyor and arranged transversely of said belts, said platen having a relatively flat and reflective upper surface, a tunnel in said platen for each of said belts whereby said belts pass through said platen and beneath the reflective upper surface thereof.

3. In a copying camera the combination of an image framing aperture, a conveyor belt adjacent said aperture adapted to support a document and to carry it past said image framing aperture, a light source adjacent said aperture adapted to light the exposed surface of the document, a reflector platen opposite said aperture having a light reflecting surface facing said aperture, a conveyor belt aperture in said reflector platen beneath said reflective surface adapted to tunnel said conveyor belt below the reflective surface whereby a document being carried by said conveyor belt passes over the reflective surface and whereby the reflective surface reflects light from said light source through said document.

4. A documet handling means for a flow-type copying camera comprising a horizontal conveyor means having a plurality of parallel conveyor strips, a drive means for said conveyor means to move said strips in synchronism comprising spaced end rollers, a reflector platen intermediate said rollers and positioned transversely of said conveyor strips and having an aperture therethrough for each one of said conveyor strips, said reflector platen having a relatively flat reflective top surface in the plane of the drive roller top edges, and said platen apertures being positioned adjacent to the upper surface of said platen but therebelow whereby said conveyor strip passes beneath the platen surface and whereby documents on said conveyor strip pass over the upper surface of the platen.

5. A document handling means for a flow-type copying camera comprising a conveyor means, an elongated platen intermediate the ends of the conveyor and transverse thereto and having a relatively flat and reflective upper surface, a transverse tunnel in said platen beneath its upper surface for said conveyor, a conveyor leveling means at each end of said tunnel having its upper surface approximately in the plane of the upper surface of said platen, and said conveyor belt passing over said leveling means and through said tunnel whereby the documents on the conveyor move over the upper surface of the platen.

6. A document handling means for a flow-type copying camera comprising a conveyor means, an elongated platen intermediate the ends of the conveyor and transverse thereto and having a relatively flat and reflective upper surface, a transverse tunnel in said platen beneath its upper surface for said conveyor, a conveyor leveling means generally parallel to said platen spaced from each of the tunneled edges thereof and each having its upper edge approximately in the plane of the upper surface of the platen, and said conveyor belt passing over said leveling means and through said tunnel whereby the documents on the conveyor move over the reflective upper surface of the platen.

7. The document handling means as claimed in claim 6 in which each conveyor leveling means comprises a roller having its top approximately in the plane of the upper surface of the platen.

8. The document handling means as claimed in claim 6 in which each of said conveyor leveling means comprises a stationary leveling bar having a smooth upper bearing surface.

9. A reflector platen for use with a conveyor belt comprising a base, an elongated reflector plate having a relatively flat reflective upper surface, an aperture intermediate said upper surface and said base to accommodate the conveyor belt, and conveyor belt leveling means on said base and spaced from each end of said aperture and each having its upper edge approximately in the plane of the upper surface of the platen.

10. A reflector platen for use with a conveyor having a plurality of parallel belts comprising a base, an elongated reflector plate having a relatively flat reflective outer surface, a plurality of apertures intermediate said outer surface and said base, each adapted to accommodate one of the conveyor belts, and conveyor belt leveling means on said base and spaced from both ends of said aperture and having their outer edges approximately in the plane of the upper surface of the platen.

11. A reflector platen for use with a conveyor having a plurality of parallel belts comprising a base, an elongated reflector plate having a relatively flat reflective surface, said plate mounted above and spaced from said base, a plurality of spacers spaced along said reflector plate and connected between said reflector plate and said base whereby a plurality of apertures are provided between said reflector plate and said base for the conveyor belts, and belt leveling means mounted on said base at each end of each of the apertures.

12. In a flow type copying apparatus, a frame, a camera thereon, conveyor means for moving a document through said frame, means for defining an area of one surface of said document to be photographed by said camera, a light source on one side of the path of movement of said document for illuminating said surface of said area, said conveyor means comprising a belt of light pervious material providing support for the portions of the document adjacent to said area, and a platen mounted in said frame having a reflective surface parallel to the path of movement of said document on the side of said path opposite from said light source for reflecting light through the document and thereby increasing the illumination thereof.

References Cited in the file of this patent

UNITED STATES PATENTS

| | | |
|---|---|---|
| 1,344,986 | Jobke | June 29, 1920 |
| 1,460,071 | Merriman | June 26, 1923 |
| 2,033,290 | Landrock | Mar. 10, 1936 |
| 2,131,501 | Dimmick | Sept. 27, 1938 |
| 2,194,808 | Pooley | Mar. 26, 1940 |
| 2,291,006 | Stuart | July 28, 1942 |
| 2,292,825 | Dilks | Aug. 11, 1942 |

FOREIGN PATENTS

| | | |
|---|---|---|
| 698,762 | Germany | Nov. 16, 1940 |